United States Patent

Johnson et al.

[15] 3,660,143
[45] May 2, 1972

[54] ACRYLIC RUBBER-URETHANE-ACRYLATE PAINT AND PAINTING PROCESS

[72] Inventors: Olin B. Johnson, Livonia; Santokh S. Labana, Dearborn Heights, both of Mich.

[73] Assignee: Ford Motor Company, Dearborn, Mich.

[22] Filed: Dec. 21, 1970

[21] Appl. No.: 100,477

[52] U.S. Cl. ............117/93.31, 260/77.5 CR, 260/77.5 TB, 260/80.75, 260/859
[51] Int. Cl. ..................................C08g 41/04, C08g 22/00
[58] Field of Search ..........................260/77.5 CR, 859, 885; 117/93.31

[56] References Cited

UNITED STATES PATENTS

| | | | |
|---|---|---|---|
| 3,423,481 | 1/1969 | Mizutani | 260/836 |
| 3,437,514 | 4/1969 | Burlant | 260/872 |
| 3,450,796 | 6/1969 | Griffin | 260/885 |
| 3,502,745 | 3/1970 | Minton | 260/881 |
| 3,509,234 | 4/1970 | Burlant | 260/859 |
| 3,528,844 | 9/1970 | Burlant | 260/885 |

*Primary Examiner*—Paul Lieberman
*Attorney*—J. R. Faulkner and O. B. Johnson

[57] ABSTRACT

A radiation-curable paint binder dispersion comprises the addition product of a hydroxy-functional acrylic rubber particle, a diisocyanate and a hydroxyalkyl acrylate and vinyl monomers. The dispersion is applied to a substrate as a paint film and cured thereon by exposure to an electron beam.

12 Claims, No Drawings

ACRYLIC RUBBER-URETHANE-ACRYLATE PAINT AND PAINTING PROCESS

A unique, rubber comprising, radiation-curable paint is provided by preparing a film-forming dispersion of vinyl monomers and the addition product of a hydroxy-functional, acrylic rubber particle, a diisocyanate and a hydroxyalkyl acrylate. This dispersion when applied as a paint film to a substrate is crosslinkable thereon by ionizing radiation, e.g., an electron beam.

I. PREPARATION OF THE ACRYLIC RUBBER PARTICLE

The acrylic rubber particle is a crosslinked, elastomeric, acrylic polymer having hydroxy functionality.

These particles can be prepared in either an aqueous or organic medium.

In one method of preparation, a major amount of monoacrylate is emulsion copolymerized with a crosslinking amount of a di- or tri- functional monomer containing two or more non-conjugated terminal ethylenic groups, preferably a diacrylate, using a water-soluble free radical initiator and a suitable surfactant to yield a latex of relatively uniform particle size, e.g., 0.04 to 1 micron average diameter.

The monoacrylate component of the monomer mixture comprises about 80 to about 98 mole percent of the mixture while the balance, the di- or tri- functional component, constitutes about 2 to about 20 mole percent. The monoacrylate component contains about 65 to about 98, preferably about 70 to about 95, mole percent of a monofunctional, alkyl monoacrylate and about 2 to about 35, preferably about 5 to about 30, mole percent of a hydroxyalkyl acrylate. The monofunctional, alkyl acrylate is preferably an ester of a $C_2 - C_8$ monohydric alcohol and acrylic acid, e.g., ethyl acrylate, butyl acrylate, hexyl acrylate, 2-ethyl hexyl acrylate and/or mixtures of the same. Certain other alkyl acrylates may be used when a crosslinked polymer thereof has an appropriate glass transition temperature, e.g., dodecyl acrylate. Butyl acrylate and 2-ethyl hexyl acrylate are the most preferred of the monofunctional, monoacrylates for use in forming this rubber. The hydroxyalkyl acrylate is preferably the ester of either acrylic or methacrylic acid and a $C_2 - C_3$ diol, e.g., hydroxyethyl acrylate, hydroxyethyl methacrylate, hydroxypropyl acrylate, hydroxypropyl methacrylate, or mixtures of the same. The glass transition temperature of the crosslinked polymer should be such that the particle retains its rubber-like properties at temperatures to which the paint would normally be exposed.

Suitable crosslinking agents include, but not by way of limitation, 1,3 - butylene diacrylate, 1,3 - butylene dimethacrylate, divinyl benzene, 1,6 - hexamethylene diacrylate, 1,6 - hexamethylene dimethacrylate, 1,1,1 - trimethylolethane triacrylate, 1,1,1 - trimethylolethane trimethacrylate, 1,1,1 - trimethylolpropane triacrylate, 1,1,1 - trimethylolpropane trimethacrylate, 1,4 - dimethylolcyclohexane dimethacrylate, allyl acrylate, allyl methacrylate, methallyl acrylate, methallyl methacrylate, diallyl maleate, diallyl fumarate and diallyl phthalate. In one embodiment, the crosslinking agent is a diester of acrylic or methacrylic acid and a $C_2 - C_8$, preferably a $C_2 - C_6$, dihydric alcohol. In another embodiment, the crosslinking agent is a triester of acrylic or methacrylic acid and a $C_2 - C_8$, preferably a $C_2 - C_6$, trihydric alcohol.

The polymerization process is continued to yield a stable latex of relatively uniform particle size and composition. The latex is coagulated, washed, and dried to yield finely divided powder suitable for use in this invention.

The monomer charge is emulsified by one or more micelle-forming compounds composed of a hydrophobic part, such as a hydrocarbon group containing eight or more carbon atoms, and a hydrophilic part, such as alkaline metal or ammonium hydroxide groups, phosphate or sulfate partial ester groups, sulfonate groups, and the like. Exemplary emulsifying agents include alkali metal sulfonates of styrene, naphthalene, decyl benzene and dodecyl benzene; sodium dodecyl sulfate; sodium stearate; sodium oleate, the sodium alkyl aryl sulfonates; polyoxymethylene sulfates and phosphates; the ethylene oxide condensates with long chain fatty acids, alcohols, and mercaptans and the alkali metal salts of rosin acids. These materials and the techniques of their employment in emulsion formation and maintenance are well known to the art and have no unusual application here. As they are conventional materials employed in a conventional manner, further description and explanation is unnecessary.

A polymerization initiator is composed of one or more water-soluble, free-radical-generating species such as hydrogen peroxide or sodium, potassium, or ammonium persulfates, perborates, peracetates, percarbonates and the like.

As is well known in the art, these initiators may be associated with activating systems such as redox systems which may incorporate mild reducing agents such as sulfites and thiosulfites and redox reaction promoters such as transition metal ions.

A chain transfer agent or a mixture of chain transfer agents may be added to the reaction medium to limit the molecular weight of the crosslinked acrylic polymers. Such chain transfer agents are generally mercaptans such as dodecanethiol, benzenethiol, pentanethiol and butanethiol. Those skilled in the art will be aware that other emulsifying agents, polymerization initiators and chain transfer agents may be used when compatible with the polymerization system herein employed. The reaction may be carried out at temperatures from about 40° C. to about 80° C., or at lower temperatures, as from 0° C. to 80° C. in the case of activated systems.

In another method of preparation, hereinafter illustrated, the rubber particles are formed in an aliphatic hydrocarbon medium.

II. THE DIISOCYANATE REACTANT

The preferred diisocyanate for use in this invention is toluene diisocyanate and this may be either the 2,4- or 2,6- isomer or a mixture thereof. This diisocyanate may be used without blocking or one of the isocyanate groups thereof may be blocked with caprolactam or other suitable blocking agent before use. One may also use other diisocyanates so long as one of the isocyanate groups is blocked with caprolactam or other suitable blocking agents. Representative of other diisocyanates which can be monoblocked are the following: 4,4' diphenylmethane diisocyanate, 1-phenoxy-2,4 - phenylene diisocyanate, 1-tert-butyl- 2, 4 - phenylene diisocyanate, and 1-ethyl - 2,4 - phenylene di- isocyanate. Such blocking allows for separate stage reactions of the two isocyanate groups. Other blocking agents such as phenols and tertiary butyl alcohols may also be used. The blocking agents are selected so that the blocked isocyanate group is converted to free isocyanate group at a temperature range of about 120° to about 170° C. Sometimes a catalyst such as triethylene diamine or stannous octoate may be advantageously used in 0.05 to 1 percent concentration (basis weight of reactants) to assist the deblocking process. A diisocyanate can be monoblocked with caprolactam by reacting the diisocyanate with caprolactam in toluene. When the first isocyanate group is blocked, the monoblocked product precipitates out of solution. See Raymond R. Myers and J. S. Long, Film-Forming Compositions, Vol. 1, Part I, page 485, published by Marcel Dekker Inc., New York, N. Y., U.S.A. (1961).

The reason for using the monoblocked diisocyanates is to assure that only one of the isocyanate groups per diisocyanate molecule will react with the hydroxy functionality of the rubber particle. The second isocyanate group of the molecule is thus left to react with the hydroxyalkyl acrylate thereby providing the addition product with alpha-beta olefinic unsaturation. When an excess of diisocyanate is employed and not removed prior to introduction of the hydroxyalkyl acrylate, there will be formed corresponding amounts of the addition product of one mole diisocyanate and 2 moles hydroxyalkyl acrylate. This provides no problem since this material is copolymerizable with the other paint binder components, increases the concentration of urethane linkages in the resultant paint film, and serves as a viscosity modifier.

III. THE HYDROXYALKYL ACRYLATE

A hydroxyalkyl acrylate is reacted with the second diisocyanate group in the next step of the process. This component is preferably employed in slight excess of the amount required to react with the remaining isocyanate groups. The preferred hydroxyalkyl acrylates are hydroxyethyl acrylate, hydroxyethyl methacrylate, hydroxypropyl acrylate, hydroxypropyl methacrylate, and mixtures of the same.

IV. VINYL MONOMERS EMPLOYED IN THE PAINT DISPERSION

The paint dispersion advantageously contains about 20 to about 90, preferably about 30 to about 65, weight percent vinyl monomers and about 10 to about 80, preferably about 35 to about 70, weight percent of the rubber-urethane-acrylate addition product. Monomer type and concentration provide one means for adjusting the viscosity of the paint solution to conform to the method of application desired, e.g., spray coating, roll coating, etc. In functional terms, the amount of vinyl monomer present is at least sufficient to convert the alpha-beta, olefinically unsaturated, rubber-urethane-acrylate addition product into a crosslinked continuous coating on the surfaces of a substrate when a film of such coating solution is exposed to ionizing radiation, e.g., an electron beam.

Vinyl monomers employed may be mono-functional, monoacrylates formed by the esterification of acrylic or methacrylic acid and a $C_1 - C_8$, preferably $C_1 - C_6$, monohydric alcohol, e.g., methyl methacrylate, ethyl acrylate, butyl acrylate, 2-ethylhexyl acrylate, etc. The monomer mixture may also include a minor amount, e.g., about 1 to about 30 mole percent, of diacrylates, e.g., the diester of acrylic or methacrylic acid and a $C_2 - C_6$ diol such as ethylene glycol diacrylate, 1,3 - butylene diacrylate, 1,3 - butylene dimethacrylate, 1,6 - hexamethylene diacrylate, 1,6 - hexamethylene dimethacrylate, etc.

Monovinyl hydrocarbons, e.g., styrene, alpha methyl styrene, vinyl toluene, etc., may also be used either alone or in combination with the aforementioned monoacrylates. Minor amounts, e.g., about 1 to about 30 mole percent of the vinyl monomer mixture may be made up of divinyl hydrocarbons such as divinyl benzene. Other vinyl monomers, e.g., acrylonitrile, methacrylonitrile, vinyl acetate, etc., may be employed in minor amounts, e.g., about 1 to about 30 mole percent.

Advantageously, at least 70 weight percent of the vinyl monomer component is made up of monoacrylates selected from esters of a $C_1 - C_8$ monohydric alcohol and acrylic or methacrylic acid and/or monovinyl hydrocarbons having about eight to about nine carbon atoms. Frequently, it is advantageous to use a mixture of about 40 to about 60 mole percent of these monoacrylates and about 60 to about 40 mole percent of the monovinyl hydrocarbons.

V. PREPARATION AND APPLICATION OF THE COATING SOLUTION TO A SUBSTRATE

By adjusting the viscosity of the coating solution to a viscosity compatible with the desired method of coating, these coatings may be applied by any of the conventional methods, e.g., brushing, spraying, roll coating, curtain coating, flow coating, etc.

The viscosity of the paint binder solution may be adjusted by varying the molecular weight of the rubber-urethane-acrylate addition product. This may be accomplished by controlling the average number of functional groups per molecule through control of the concentration of the hydroxy-alkyl acrylate constituent in forming the rubber particle. The viscosity may also be regulated by varying the relative concentration of the resin component with respect to the vinyl monomer component and/or by varying the relative concentration of dissimilar monomers within the vinyl monomer component. The binder solution may be applied to the substrate essentially free of non-polymerizable, organic solvents and/or diluents or it may be applied with the solvents and/or diluents in a method of application wherein the solvent and/or diluents are flashed off prior to polymerization.

The coatings may be applied to any substrate, e.g., metal, wood, glass, shaped polymeric solids, etc. These coatings will ordinarily be applied to an average depth in the range of about 0.1 to about 4 mils, more commonly about 0.5 to about 2 mils.

VI. CURING OF THE COATING

The films formed of the paints of this invention can be cured with ionizing radiation at relatively low temperatures, e.g., room temperature (20° to 25° C.) or a temperature between room temperature and that temperature at which significant vaporization of its most volatile component is initiated, ordinarily between 20° C. and 75° C. The radiation is applied at dose rates of about 0.1 to about 100 Mrad per second on a workpiece, preferably a moving workpiece, with the coating receiving a total dose in the range of about 1 to about 25, more commonly about 8 to about 15 Mrad.

The term "ionizing radiation" as employed herein means radiation having sufficient energy to remove an electron from a gas atom, forming an ion, hence radiation with minimum energy of, or equivalent to, about 5,000 electron volts except when the curing is carried out in a vacuum. The preferred method of curing films of the instant paint binders upon the substrates to which they have been applied is by subjecting such films to a beam of polymerization effecting electrons which at its source of emission is within the range of, or equivalent to, about 100,000 to about 500,000 electron volts. If irradiation is carried out in vacuum or at reduced pressure, this energy may be considerably lower. In this method of curing, it is preferred to employ a minimum of about 25,000 electron volts per inch of distance between the radiation emitter and the workpiece where the intervening space is occupied by air or other gas of comparable density. Adjustment is made for the relative resistance of the intervening gas which is preferably an oxygen-free, inert gas such as nitrogen or helium.

In this application, the term "paint" is meant to include finely ground pigment and/or filler in the binder, the binder without pigment and/or filler or having very little of the same, which can be tinted, if desired. Thus, the binder which is ultimately converted to a durable film resistant to wear, weather, etc., can be all or virtually all that is used to form the film, or it can be a vehicle for pigmentary and/or mineral filler material.

The abbreviation "Mrad" as employed herein means 1 million rad. The term "rad" as employed herein means that dose of radiation which results in the absorption of 100 ergs of energy per gram of absorber, i.e., coating film. The electron emitting means may be a linear electron accelerator capable of producing a direct current potential in the range hereinbefore mentioned. In such device, electrons are ordinarily emitted from a hot filament and accelerated through a uniform voltage gradient. The electron beam, which may be about ⅛ inch in diameter at this point, is then scanned in one direction to make a fan-shaped beam and then passing through a metal window, e.g., aluminum, aluminum-copper alloy, or magnesium-thorium alloy of about 0.003 inch thickness.

This invention will be more fully understood from the following examples:

EXAMPLE 1

I. Rubber particles are prepared in aqueous medium using the following procedures: To 1,000 parts by weight water which has been boiled and cooled to room temperature under a nitrogen atmosphere are added 2.86 parts by weight sodium dodecyl sulfate dissolved in 35.7 parts by weight water and about 1/9 of a monomer mixture consisting of 521 parts by weight butyl acrylate and 48.5 parts by weight 1,3 - butylene dimethacrylate. This mixture is stirred to establish dispersion of the monomers and 3.14 parts by weight potassium persulfate dissolved in 71.4 parts by weight water are added to the stirred mixture. This mixture is heated to 45° C. After about 10 minutes, addition of the remainder of this monomer mixture is begun at a rate such that the temperature of the reaction mixture is maintained at 47° to 50° C. During the addition of the last two thirds of the monomer mixture, 5.72 parts by weight sodium dodecyl sulfate dissolved in 35.7 parts by weight water are added at a substantially constant rate. During the addition of the last one-third of the monomer mixture there are added 65 parts by weight hydroxyethyl acrylate. The reaction mixture is maintained at 47° to 50° C. for about 2 hours.

The emulsion is then coagulated by addition of about 20 grams of concentrated hydrochloric acid solution and 100 ml of water. The rubber particles are isolated by filtration and washed with methanol containing 1 weight percent of hydrochloric acid. The particles are then dried.

II. Determination of the concentration of reactive hydroxyl groups on the surfaces of the particles is made by the well known method of analysis wherein the hydroxyl groups are reacted with acetic anhydride using a pyridine catalyst. The acetic acid is back titrated with sodium hydroxide. For details, reference is made to C. A. Steyermark, Quantitative Organic Analysis, pp. 302–303 published by Blakiston Company, New York, Toronto, and Philadelphia (1951).

III. The hydroxy-functional rubber particles prepared in I above are reacted with a diisocyanate using the following procedures: The hydroxy-functional particles in the quantity providing 1 mole of reactive hydroxyl groups on the collective surfaces thereof are suspended in toluene and 2,4 - toluene diisocyanate, in the quantity necessary to provide about 3 isocyanate groups per each hydroxyl group, is incrementally added at a rate slow enough to keep the temperature of the reaction mix below 32° C. After the initial exotherm subsides, the reaction mixture is stirred for 1 hour.

IV. The rubber-diisocyanate adduct is mixed with a hydroxyalkyl acrylate using the following procedure: The temperature of the reaction mix is raised to about 45° C. and hydroxyethyl methacrylate monomer is added in slight excess (e.g., 5 to 7 percent excess) of that required to react with the unreacted isocyanate groups. It is added slowly and incrementally and the reaction is stirred continuously for several hours. The solvent is removed under vacuum until the solvent content of the product mix is less than 15 percent. The rubber-urethane-acrylate addition product, hereinafter referred to as resin, is ready for employment in coating compositions.

V. Paint dispersions are prepared form the rubber-urethane acrylate resin and vinyl monomers: The rubber-urethane-acrylate resin is divided into three fractions and each is diluted with methyl methacrylate monomer to form three paint dispersions. The first paint dispersion contains about 75 weight percent rubber-urethane-acrylate resin and about 25 weight percent methyl methacrylate. The second paint dispersion contains about 50 weight percent of the rubber-urethane-acrylate and about 50 weight percent methyl methacrylate. The third paint dispersion contains about 25 weight percent of the rubber-urethane-acrylate resin and about 75 weight percent methyl methacrylate.

VI. Coating of substrates: The dispersions prepared in V. above are separately coated on substrates of steel, wood, glass and polymeric solids, i.e., acrylonitrile-butadiene-styrene copolymer, to an average depth of about 7/10 mil (0.0007 inch) and irradiated with an electron beam. The conditions of irradiation are as follows:

| Potential | 275 KV |
|---|---|
| Current | 30 milliamperes |
| Distance, emitter from workpiece | 10 inches |
| Dose | 10 Mrad |
| Atmosphere | nitrogen |

EXAMPLE 2

The procedure of Example 1 is repeated with the difference that an equimolar amount of ethyl acrylate is substituted for the butyl acrylate used in the monomer mixture to form the rubber particles and one half of the methyl methacrylate used to form the coating dispersions with the rubber-urethane-acrylate addition product is replaced with an equimolar amount of styrene.

EXAMPLE 3

The procedure of Example 1 is repeated with the differences that an equimolar amount of 2-ethyl hexyl acrylate is substituted for the butyl acrylate used in the monomer mixture to form the rubber particle, and the vinyl monomer component used to form the coating solution with the rubber-urethane-acrylate addition product (resin) is a mixture of 30 mole percent methyl methacrylate, 20 mole percent butyl methacrylate, 10 mole percent 2-ethyl hexyl acrylate, 20 mole percent styrene and 20 mole percent vinyl toluene.

EXAMPLE 4

The procedure of Example 1 is repeated with the differences that an equimolar amount of cyclohexyl acrylate is substituted for the butyl acrylate and equimolar amounts of 1,3 - butylene diacrylate is substituted for the 1,3 - butylene dimethacrylate used to form the rubber particles and the vinyl monomer component used to form the coating dispersion with the rubber-urethane-acrylate addition product is a mixture of 70 mole percent methyl methacrylate, 20 mole percent alpha methyl styrene and 10 mole percent 1,3 - butylene dimethacrylate.

EXAMPLE 5

The procedure of Example 1 is repeated with the difference that an equimolar amount of 1,6 - hexamethylene diacrylate is substituted for the 1,3 - butylene dimethacrylate used to form the rubber particle.

EXAMPLE 6

The procedure of Example 1 was repeated with the differences that an equimolar amount of divinyl benzene is substituted for the 1,3 - butylene dimethacrylate used in the monomer mixture to form the rubber particle and the vinyl monomer component used to form the coating dispersion with the rubber-urethane-acrylate addition product is a mixture of 60 mole percent methyl methacrylate, 20 mole percent styrene, 10 mole percent butyl acrylate, and 10 mole percent divinyl benzene.

EXAMPLE 7

The procedure of Example 1 is repeated with the difference that a single paint dispersion is formed using 60 weight percent of the rubber-urethane-acrylate addition product and 40 weight percent of the methyl methacrylate.

EXAMPLE 8

The procedure of Example 1 is repeated with the difference that a single paint dispersion is formed using 40 weight percent of a rubber-urethane-acrylate addition product and 60 weight percent of the methyl methacrylate.

EXAMPLE 9

The procedure of Example 1 is repeated except for the differences that the monoacrylate component of the monomer mixture used to form the rubber particle consists of about 5 mole percent hydroxyethyl methacrylate and about 95 mole percent butyl acrylate. The monomers are divided into five equal fractions for addition to the reaction mixture and the hydroxyethyl methacrylate is added in the fifth or last increment.

EXAMPLE 10

The procedure of Example 1 is repeated except for the differences that the monoacrylate component of the monomer mixture used to form the rubber particle consists of about 15 mole percent hydroxyethyl acrylate and about 85 mole percent butyl acrylate and the diacrylate is 1,3 butylene diacrylate. The monomer mixture is divided into about five equal fractions and the hydroxyethyl acrylate is added in the fifth and last fraction.

EXAMPLE 11

The procedure of Example 1 is repeated with the differences that the curing is carried out in a helium atmosphere and the potential of the electron beam upon exit from the electron window into such atmosphere is about 295 KV.

EXAMPLE 12

The procedure of Example 1 is repeated with the differences that the curing is carried out in a nitrogen atmosphere containing a minor amount of $CO_2$ and the potential of the electron beam upon exit from the electron window into such atmosphere is about 260 KV.

EXAMPLE 13

Substrates are coated in accordance with this invention using the following procedures:

I. Rubber particles are prepared in an organic medium using the procedure set forth below:
A. A mixture is formed from the following materials:

| Materials | Grams |
| --- | --- |
| Ethyl acrylate | 60.0 |
| Hydroxyethyl methacrylate | 20.0 |
| 1,3-butylene dimethacrylate | 20.0 |
| Dispersion agent[1] | 3.0 |
| AIBN[2] | 0.5 |

(1) An amphiphatic copolymer (1 portion soluble in the acrylic monomers and the other portion soluble in the solvent, e.g., dodecane) is prepared by reacting 12 - hydroxystearic acid (300 g.) in the presence of stearyl alcohol (310 g.) and p-toluene sulfonic acid (5 g.) at 180° - 190° C. until the acid value is less than 1 mg KOH/g. The product is then reacted with methacrylic anhydride (170 g.) The resulting material is then copolymerized with an equimolar amount of methyl methacrylate using AIBN initiator (9 g.) and butyl acetate solvent. This method of producing this dispersing agent is described in detail by K. E. J. Barratt and H. R. Thomas in Journal of Polymer Science, Part A1, Vol. 7, 2625 (1969). Other dispersing agents which are effective for stabilizing suspensions in hydrocarbon liquids may be used in place of the above described materials.
(2) 2,2' azobis - (2-methylpropionitrile).

B. Two-thirds of the mixture of the above listed materials, excepting the hydroxyethyl methacrylate, are added to 1,000 grams n-dodecane under nitrogen. the reaction mixture is warmed to 40° C. When the exotherm starts, the temperature is allowed to rise to 80° C. The temperature is maintained at 80° C. for about 10 minutes. The hydroxyethyl methacrylate and the final one-third of the other materials are added slowly. The temperature is maintained at 80° C. for 30 minutes.

II. The hydroxy-functional rubber particles prepared in I above are reacted with a diisocyanate using the following procedure: The temperature of the reaction mixture is allowed to cool to 30° C. and there is slowly added 132 grams of 2,4 - toluene diisocyanate. The temperature is maintained in the range of 30° – 35° C. for 2 hours.

III. There is added to the reaction mix 125 grams of hydroxyethyl methacrylate. The reaction mix is then heated at 45° C. for 4 hours. The rubber-urethane-acrylate addition product particles are separated from the solvent by filtration.

IV. A paint dispersion is prepared using 40 parts by weight of the rubber-urethane-acrylate addition product and 60 parts by weight of an equimolar amount of methyl methacrylate and styrene.

V. Coating of substrates: Paint dispersion prepared in IV is sprayed upon substrates of steel, aluminum, glass, paper, wood and polymeric solid, i.e., polypropylene. During the reaction step about 1.5 mils and cured thereon placing said substrates in a nitrogen atmosphere and exposing the coated surfaces of the substrates to an electron beam (potential 275 KV current 30 miliamperes) until the coatings are cross-linked upon the surfaces of the substrates and are tack-free to the touch.

EXAMPLE 14

The procedure of Example 13 is repeated with the differences that an equimolar amount of 4,4' - diphenylmethane diisocyanate with 1 isocyanate group per molecule blocked with caprolactam is substituted for the 2,4 - toluene diisocyanate. In the reaction of the diisocyanate with hydroxy functional rubber in Section II of the procedure of Example 13 and the procedure of Section III of Example 13 is modified in that, as the hydroxyethyl methacrylate monomer is dispersed in the reaction mixture, the temperature of the reaction mixture is raised to about 150° C. and maintained at a temperature of about 150° C. while the reaction mixture is stirred for about 30 minutes.

EXAMPLE 15

The procedure of Example 13 is repeated with the differences that an equimolar amount of 1-phenoxy - 2,4 - phenylene diisocyanate with 1 isocyanate group per molecule blocked with caprolactam is substituted for the 2,4 - toluene diisocyanate in the reaction of diisocyanate with hydroxy-functional rubber in Section II of the procedure of Example 13 and the procedure of Section III of Example 13 as modified in that, as the hydroxyethyl methacrylate monomer is dispersed in the reaction mixture, the temperature is raised to about 150° C. and maintained at a temperature of about 150° C. while the reaction mixture is stirred for about 30 minutes.

EXAMPLE 16

The procedure of Example 13 is repeated with the differences that an equimolar amount of 1-tert-butyl- 2,4 - phenylene diisocyanate with 1 isocyanate group per molecule blocked with caprolactam is substituted for the 2,4 - toluene diisocyanate in the reaction of diisocyanate with hydroxy-functional rubber in Section II of the procedure of Example 13 and the procedure of Section III of Example 13 is modified in that, as the hydroxyethyl methacrylate monomer is dispersed in the reaction mixture, the temperature of the reaction mixture is raised to about 150° C. and maintained at a temperature of about 150° C. while the reaction mixture is stirred for about 30 minutes.

EXAMPLE 17

The procedure of Example 13 is repeated with the differences that an equimolar amount of 1-ethyl- 2,4 - phenylene diisocyanate with 1 isocyanate group per molecule blocked with caprolactam is substituted for the 2,4 - toluene diisocyanate in the reaction of diisocyanate with hydroxy-functional rubber in Section II of the procedure of Example 13 and the procedure of Section III of Example 13 is modified in that, as the hydroxyethyl methacrylate monomer is dispersed in the reaction mixture, the temperature of the reaction mixture is raised to about 150° C. and maintained at a temperature of about 150° C. while the reaction mixture is stirred for about 30 minutes.

EXAMPLE 18

The procedures of Examples 1 and 13 are repeated except for the difference that a functionally equivalent amount of 1,1,1-trimethylolethane triacrylate is substituted for the 1,3-butylene dimethacrylate in the formation of the hydroxy-functional rubber particle.

EXAMPLE 19

The procedures of Examples 1 and 13 are repeated except for the difference that a functionally equivalent amount of 1,1,1-trimethylolpropane, trimethacrylate is substituted for the 1,3-butylene dimethacrylate in the formation of the hydroxy-functional rubber particle.

EXAMPLE 20

The procedures of Examples 1 and 13 are repeated except for the difference that a functionally equivalent amount of 1,4-dimethylolcyclohexane dimethacrylate is substituted for the 1,3-butylene dimethacrylate in the formation of the hydroxy-functional rubber particles.

The terms "acrylate" and "acrylates," when used herein without a modifier distinguishing between esters of acrylic and methacrylic acid, shall be understood to include both. This, of course, does not apply to the naming of a specific compound.

It will be understood by those skilled in the art that modifications can be made within the foregoing examples within the scope of the invention as hereinbefore described and hereinafter claimed.

We claim:

1. A rubber-urethane-acrylate addition product formed by reacting a first isocyanate group of a diisocyanate with a hydroxy-functional elastomeric particle of crosslinked acrylic polymer and reacting the remaining isocyanate group of said diisocyanate with a hydroxyalkyl acrylate, said particle of crosslinked acrylic polymer consisting essentially of
   1. about 80 to about 98 mole percent of a monoacrylate component which consists essentially of about 70 to about 95 mole percent of a monoester of acrylic acid and a $C_2 - C_8$ monohydric alcohol and about 5 to about 30 mole percent of a hydroxy-functional acrylate selected from hydroxyethyl acrylate, hydroxyethyl methacrylate, hydroxypropyl acrylate and hydroxypropyl methacrylate, and
   2. about 2 to about 20 mole percent of divinyl benzene, a diester of acrylic or methacrylic acid and a $C_2 - C_6$ dihydric alcohol or a triester of acrylic acid or methacrylic acid and a $C_2 - C_6$ trihydric alcohol.

2. A rubber-urethane-acrylate addition product in accordance with claim 1 wherein said particle of crosslinked acrylic rubber has average diameter in the range of about 0.04 to 1 micron.

3. A rubber-urethane-acrylate addition product in accordance with claim 1 wherein said monoester of acrylic acid is butyl acrylate and said diacrylate is selected from 1,3 - butylene diacrylate and 1,3 - butylene dimethacrylate.

4. A rubber-urethane-acrylate addition product in accordance with claim 1 wherein said monoester of acrylic acid is butyl acrylate and said diacrylate is selected from 1,3 - butylene diacrylate and 1,3 - butylene dimethacrylate.

5. A rubber-urethane-acrylate addition product in accordance with claim 1 wherein said diisocyanate is toluene diisocyanate.

6. A rubber-urethane-acrylate addition product in accordance with claim 1 wherein said hydroxyalkyl acrylate is selected from hydroxyethyl acrylate, hydroxyethyl methacrylate hydroxypropyl acrylate and hydroxypropyl methacrylate.

7. A rubber-urethane-acrylate addition product formed by reacting a first isocyanate group of a diisocyanate with a hydroxy-functional elastomeric particle of crosslinked acrylic polymer and reacting the remaining isocyanate group of said diisocyanate with a hydroxyalkyl acrylate, said particle of crosslinked acrylic polymer consisting of
   1. about 80 to about 98 mole percent of a monoacrylate component which consists essentially of about 65 to about 98 mole percent of a monoester of acrylic acid and a $C_2 - C_8$ monohydric alcohol and about 2 to about 35 mole percent of a hydroxy-functional acrylate selected from hydroxyethyl acrylate, hydroxyethyl methacrylate, hydroxypropyl acrylate and hydroxypropyl methacrylate, and
   2. about 2 to about 20 mole percent of divinyl benzene, a diester of acrylic or methacrylic acid and a $C_2 - C_8$ dihydric alcohol or a triester of acrylic or methacrylic acid and a $C_2 - C_8$ trihydric alcohol.

8. A radiation-curable paint which on a pigment and mineral filler-free basis comprises a film-forming dispersion of about 35 to about 65 weight percent vinyl monomers and about 70 to about 35 weight percent of a rubber-urethane-acrylate addition product formed by reacting a first isocyanate group of a diisocyanate with a hydroxy-functional elastomeric particle of crosslinked acrylic polymer and reacting the remaining isocyanate group of said diisocyanate with a hydroxyalkyl acrylate, said particle of crosslinked acrylic polymer consisting essentially of
   1. about 80 to about 98 mole percent of a monoacrylate component which consists essentially of about 70 to about 95 mole percent of a monoester of acrylic acid and a $C_2 - C_8$ monohydric alcohol and about 5 to about 30 mole percent of a hydroxy-functional acrylate selected from hydroxyethyl acrylate, hydroxyethyl methacrylate, hydroxypropyl acrylate and hydroxypropyl methacrylate, and
   2. about 2 to about 20 mole percent of divinyl benzene, a diester of acrylic or methacrylic acid and a $C_2 - C_8$ dihydric alcohol or a triester of acrylic acid or methacrylic acid and a $C_2 - C_8$ trihydric alcohol.

9. A radiation-curable paint which on a pigment and mineral filler-free basis comprises a film-forming dispersion of about 20 to about 90 weight percent vinyl monomers and about 80 to about 10 weight percent of a rubber-urethane-acrylate addition product formed by reacting a first isocyanate group of a diisocyanate with a hydroxy-functional elastomeric particle of crosslinked acrylic polymer and reacting the remaining isocyanate group of said diisocyanate with a hydroxyalkyl acrylate, said particle of crosslinked acrylic polymer consisting essentially of
   1. about 80 to about 98 mole percent of a monoacrylate component which consists essentially of about 65 to about 98 mole percent of a monoester of acrylic acid and a $C_2 - C_8$ monohydric alcohol and about 2 to about 35 mole percent of a hydroxy-functional acrylate selected from hydroxyethyl acrylate, hydroxyethyl methacrylate, hydroxypropyl acrylate and hydroxypropyl methacrylate, and
   2. about 2 to about 20 mole percent of divinyl benzene, a diester of acrylic or methacrylic acid and a $C_2 - C_8$ dihydric alcohol or a triester of acrylic or methacrylic acid and a $C_2 - C_8$ trihydric alcohol.

10. The method of coating a substrate which comprises
    A. applying to a surface of said substrate a film of radiation-curable paint which on a pigment and mineral filler-free basis comprises a film-forming dispersion of about 20 to about 90 weight percent vinyl monomers and about 80 to about 10 weight percent of a rubber-urethane-acrylate addition product formed by reacting a first isocyanate group of a diisocyanate with a hydroxyalkyl acrylate, said particle of crosslinked acrylic polymer consisting essentially of
       1. about 80 to about 98 mole percent of a monoacrylate component which consists essentially of about 65 to about 98 mole percent of a monoester of acrylic acid and a $C_2 - C_8$ monohydric alcohol and about 2 to about 35 mole percent of a hydroxy-functional acrylate selected from hydroxyethyl acrylate, hydroxyethyl methacrylate, hydroxypropyl acrylate and hydroxypropyl methacrylate, and
       2. about 2 to about 20 mole percent of divinyl benzene, a diester of acrylic or methacrylic acid and a $C_2 - C_8$ dihydric alcohol or triester of acrylic or methacrylic acid and a $C_2 - C_8$ dihydric alcohol or a triester of acrylic or methacrylic acid and a $C_2 - C_8$ trihydric alcohol, and B. crosslinking said film upon said substrate by exposing said substrate to a beam of electrons having average energy in the range of about 100,000 to about 500,000 electron volts.

11. An article of manufacture comprising in combination a substrate and a coating thereon comprising the polymerization product of a film-forming dispersion crosslinked in situ by ionizing radiation, said film-forming dispersion on a pigment and particulate filler-free basis consisting essentially of a rubber-urethane-acrylate addition product formed by reacting a first isocyanate group of a diisocyanate with a hydroxy-functional elastomeric particle of crosslinked acrylic polymer and reacting the remaining isocyanate group of said diisocyanate with a hydroxyalkyl acrylate, said particle of crosslinked acrylic polymer consisting essentially of
1. about 80 to about 98 mole percent of a monoacrylate component which consists essentially of about 70 to about 95 mole percent of a monoester of acrylic acid and a $C_2 - C_8$ monohydric alcohol and about 5 to about 30 mole percent of a hydroxy-functional acrylate selected from hydroxyethyl acrylate, hydroxyethyl methacrylate, hydroxypropyl acrylate and hydroxypropyl methacrylate, and
2. about 2 to about 20 mole percent of divinyl benzene, a diester of acrylic or methacrylic acid and a $C_2 - C_6$ dihydric alcohol or a triester of acrylic acid or methacrylic acid and a $C_2 - C_6$ trihydric alcohol.

12. An article of manufacture comprising in combination a substrate and a coating thereon comprising the polymerization product of a film-forming dispersion crosslinked in situ by ionizing radiation, said film-forming dispersion on a pigment and particulate filler-free basis consisting essentially of about 20 to about 90 weight percent vinyl monomers and about 80 to about 10 weight percent of a rubber-urethane-acrylate addition product formed by reacting a first isocyanate group of a diisocyanate with a hydroxy-functional elastomeric particle of cross-linked acrylic polymer and reacting the remaining isocyanate group of said diisocyanate with a hydroxyalkyl acrylate, said particle of crosslinked acrylic polymer consisting essentially of about 20 to about 90 weight percent vinyl monomers and about 80 to about 10 weight percent of a rubber-urethane-acrylate addition product formed by reacting a first isocyanate group of a diisocyanate with a hydroxy-functional elastomeric particle of crosslinked acrylic polymer and reacting the remaining isocyanate group of said diisocyanate with a hydroxyalkyl acrylate, said particle of crosslinked acrylic polymer consisting essentially of
1. about 80 to about 98 mole percent of a monoacrylate component which consists essentially of about 65 to about 98 mole percent of a monoester of acrylic acid and a $C_2 - C_8$ monohydric alcohol and about 2 to about 35 mole percent of a hydroxy-functional acrylate selected from hydroxyethyl acrylate, hydroxyethyl methacrylate, hydroxypropyl acrylate and hydroxypropyl methacrylate, and
2. about 2 to about 20 mole percent of divinyl benzene, a diester of acrylic or methacrylic acid and a $C_2 - C_8$ dihydric alcohol or a triester of acrylic or methacrylic acid and a $C_2 - C_8$ trihydric alcohol.

* * * * *